United States Patent [19]

Schuster et al.

[11] Patent Number: 5,300,133
[45] Date of Patent: Apr. 5, 1994

[54] SOOT PARTICLE EXHAUST-GAS FILTER

[75] Inventors: Hans-Dieter Schuster, Schorndorf; Wolfgang Zahn, Ludwigsburg; Hans-Joachim Langer, Remseck; Bernhard Jokl, Neuhausen, all of Fed. Rep. of Germany

[73] Assignee: Mercedes-Benz AG, Fed. Rep. of Germany

[21] Appl. No.: 5,075

[22] Filed: Jan. 15, 1993

[30] Foreign Application Priority Data

Jan. 17, 1992 [DE] Fed. Rep. of Germany ....... 4201111

[51] Int. Cl.$^5$ ..................... B01D 25/26; B01D 29/46
[52] U.S. Cl. ......................................... 55/489; 55/512; 55/DIG. 30
[58] Field of Search ................ 55/521, 523, DIG. 10, 55/DIG. 30, 486–489

[56] References Cited

U.S. PATENT DOCUMENTS

| 3,739,553 | 6/1973 | Aine | 55/DIG. 30 |
| 4,276,071 | 6/1981 | Outland | 55/DIG. 30 |
| 4,364,761 | 12/1982 | Berg et al. | 55/DIG. 30 |
| 4,415,344 | 11/1983 | Frost et al. | 55/DIG. 30 |
| 4,416,676 | 11/1983 | Montierth | 55/523 |
| 4,420,316 | 12/1983 | Frost et al. | 55/523 |
| 4,441,899 | 4/1984 | Takagi et al. | 55/DIG. 30 |
| 4,509,966 | 4/1985 | Dimick et al. | 55/523 X |
| 4,519,820 | 5/1985 | Oyobe et al. | 55/DIG. 30 |
| 4,652,286 | 3/1987 | Kusuda et al. | 55/DIG. 30 |
| 4,695,301 | 9/1987 | Okajima et al. | 55/DIG. 30 |
| 4,718,926 | 1/1988 | Nakamoto et al. | 55/DIG. 30 |
| 4,833,883 | 5/1989 | Oda et al. | 55/DIG. 30 |
| 4,960,449 | 10/1990 | Yonushonis | 55/DIG. 30 |
| 5,104,627 | 4/1992 | Usui et al. | 55/DIG. 30 |
| 5,114,581 | 5/1992 | Goldsmith et al. | 55/523 X |
| 5,204,067 | 4/1993 | Haerle | 55/DIG. 30 |
| 5,215,724 | 6/1993 | Haerle | 55/DIG. 30 |

FOREIGN PATENT DOCUMENTS

| 0087067 | 8/1983 | European Pat. Off. . |
| 3043996 | 6/1981 | Fed. Rep. of Germany . |
| 3330020 | 2/1985 | Fed. Rep. of Germany . |
| 58-150015 | 9/1983 | Japan | 55/523 |
| 61-004813 | 1/1986 | Japan | 55/523 |
| 63-007817 | 1/1988 | Japan | 55/523 |
| 961806 | 6/1964 | United Kingdom | 55/521 |

Primary Examiner—Robert Spitzer
Attorney, Agent, or Firm—Evenson, McKeown, Edwards & Lenahan

[57] ABSTRACT

An exhaust-gas filter, for example a soot-particle filter, has a filter element which has inlet passages for the raw gas and outlet passages for the clean gas. In order as far as possible to prevent clogging of the filter over the running time caused by deposits on the filter walls, the raw-gas passages are configured with a larger cross-section than the clean-gas passages.

2 Claims, 1 Drawing Sheet

SOOT PARTICLE EXHAUST-GAS FILTER

BACKGROUND AND SUMMARY OF THE INVENTION

The present invention relates to an exhaust-gas filter, and, more particularly, a soot-particle exhaust gas filter, comprising a filter element constructed in layers of filter plates configured in wave form transversely to a flow direction of exhaust gas and, in a continuous layer sequence, are arranged alternately to form with one another inlet passages for raw gas and outlet passages for clean gas.

An exhaust-gas filter shown in DE-OS 33 30 020 A1 is configured as a right parallelepiped. Its the filter element comprises a plurality of filter plates arranged in layers one on top of the other. The filter plates have a waved or flat structure transversely to the direction of flow of the exhaust gas, wherein a waved layer alternates layer by layer with a flat layer. For conducting the exhaust gas through the passage side walls, the filter passages formed between the filter plates are closed on alternate sides and thereby form raw-gas and clean-gas passages. The exhaust-gas filter described has, however, the disadvantage that, as the running time of the motor vehicle increases, the volume of the filter and the entry area of the filter are reduced by deposition of combustion residues such as, for example, soot particles, oil ash and fuel additives on the filter wall. As a result, the counterpressure to the exhaust gas increases greatly. This results in a reduction in the engine power and an increase in consumption.

An object of the present invention is to provide an exhaust-gas filter such that clogging of the filter owing to deposition of combustion residues on the filter walls over the running time of the motor vehicle is prevented.

The object is achieved according to the present invention by configured the filter such that the inlet passages have a larger cross-section than a cross-section of the outlet passages, the inlet passages and the outlet being formed by a sinusoidal configuration of the filter plates and respective pairs of mutually neighboring filter plates having an identical phase and periodically, but different amplitude and forming a plate group with a layer structure arranged phase-shifted by 180° with respect to neighboring plate groups.

In the present invention, the raw-gas passages are thus provided with a larger cross-section than the clean-gas passages. Because of the enlargement of the wall area of the raw-gas passages, a significantly higher accumulating capacity of the filter results, which at least delays clogging of the filter to a later time. Furthermore, the raw-gas passages covered by the deposits lie closer together, whereby an improved heat transfer between passages carrying the raw gas is achieved and consequently more favorable thermal preconditions for soot burn-off are created. Altogether, due to the increased storage capacity of the filter and the improved thermal conditions for burning off the soot particles over the running time, clogging of the filter is prevented. In addition, the susceptibility of the filter to burning through of the filter walls during soot burn-off is reduced, since the soot filtered out over the running time is distributed over a larger filter surface.

In a constructionally advantageous development of the present invention, the filter plates are sinusoidally waved transversely to the direction of flow of the exhaust gas. Respective pairs of mutually neighboring filter plates have the same phase and the same period but different amplitude and forming a plate group which in the layer structure is arranged phase shifted by 180° with respect to neighboring plate groups. Raw-gas passages of large cross section or clean-gas passages of smaller cross-section are bounded alternately in continuous layer sequence by mutually neighboring filter plates. As a result, the configuration of an exhaust-gas filter having an enlarged filter area for the raw gas with the same external dimensions as in the case of a conventional exhaust-gas filter is made possible.

According to another advantageous embodiment of the present invention, the waving of a filter plate is formed by wave crest groups of the same amplitude which are connected by deep wave troughs and are for their part in each case composed of wave crests connected to one another by flat wave troughs. In this instance, the layer structure of the filter is made up by a continuous reflection of a filter plate at an imaginary plane which forms a tangent to the vertices of the deepest wave troughs of the respective filter plate. Filter passages of various cross-sections are formed between the filter plates. The filter passages of largest cross-section are assigned to the conducting of raw gas. Apart from the constructional advantage of the external dimensions of the filter element remaining the same with regard to conventional exhaust-gas filters, with at the same time an enlargement of the filter area for raw gas, this embodiment of the invention has the technical advantage in terms of production that only one filter plate form is required for the construction of the exhaust-gas filter.

BRIEF DESCRIPTION OF THE DRAWINGS

These and further objects, features and advantage of the present invention will become readily apparent from the following detailed description of currently preferred embodiments when taken in conjunction with the accompanying drawings wherein.

DETAILED DESCRIPTION OF THE DRAWINGS

Figure 1:
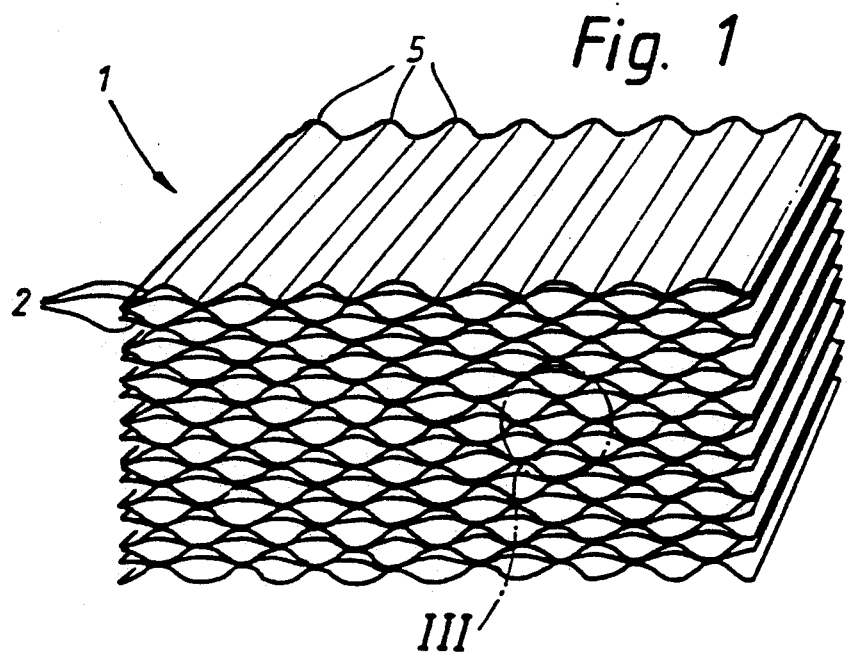
FIG. 1 is a sectional perspective view of a filter element of a soot-particle filter comprising waved filter plate groups with filter plates of differing amplitude according to an embodiment of the present invention.
Figure 3:
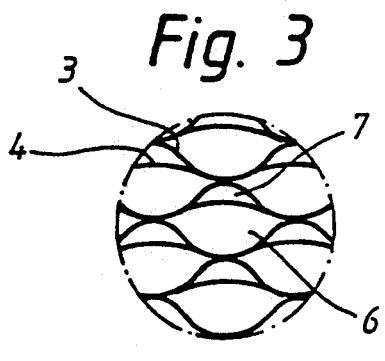
FIG. 3 is an isolated enlarged view of the layer structure of the filter element of FIG. 1.

FIG. 1 shows a right-parallelepipedal filter element 1 of a soot-particle filter, which comprises a plurality of filter plates 2 of sintered metal arranged in layers one on top of the other. The filter plates 2 have a sinusoidal wave shape transverse to the direction of flow of the exhaust gas and, as illustrated in FIG. 3, divided into filter plates 3 with a large amplitude wave form and filter plates 4 with a wave of small amplitude wave forms. During construction of the filter element 1, the filter plates 3 and 4 are arranged alternately in layers one on top of the other, but with their respective wave forms having the same phase and period. Pairs of respectively neighboring filter plates 3 and 4 form a filter plate group which, repeatedly arranged in layers one on top of the other, forms the layer structure of the filter element 1.

Mutually neighboring filter plate groups are arranged phase-shifted in the waving by 180° with respect to one another. The filter plates 4 rest with their wave troughs on one hand on the crest lines 5 of the wave crests of neighboring filter plates 3 adjoining downwards in the layer sequence. On the other hand, the wave troughs of the filter plates 4 form a support for the crest lines of the wave troughs of the upwardly adjoining neighboring filter plates 3. Exhaust gas filter passages are formed between the supports of the filter plates 3 and 4. The wave crests of each filter plate 4 delimit with the wave troughs of the respectively downwardly adjoining filter plate 3, with respect to the layer structure, exhaust-gas filter passages 6 of large cross-section for conducting raw gas and delimit with the wave crests of the respectively upwardly adjoining filter plate 3, with respect to the layer structure, exhaust-gas filter passages 7 of small cross section for conducting clean gas. For the flowing-through of the plate areas, the filter plates forming the raw-gas passages 6 are pressure-welded to one another at the end of the soot-particle filter on the outflow side, and the filter plates forming the clean-gas passages 7 are pressure-welded to one another at the end of the soot-particle filter on the inflow side.

Figure 2:
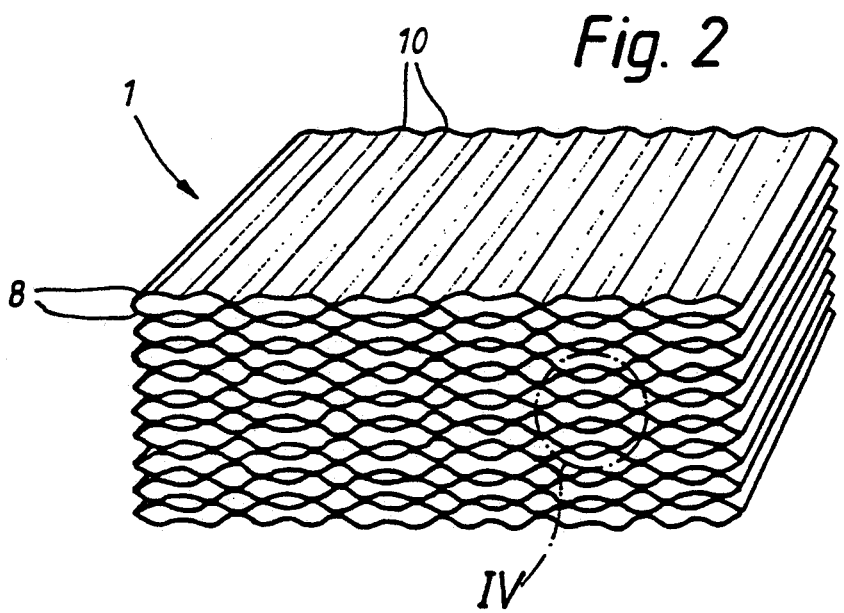
FIG. 2 is a sectional perspective view similar to FIG. 1 of a filter element from FIG. 1 comprising filter plates arranged mirror-invertedly in layers one on top of the other.
Figure 4:
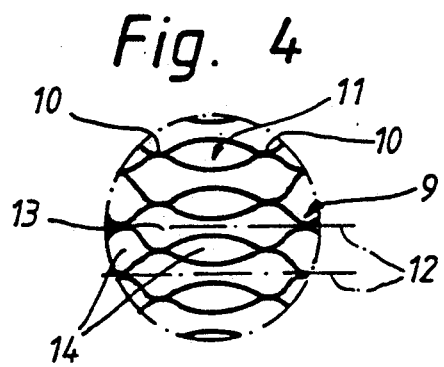
FIG. 4 is an isolated view of the layer structure of the filter element of FIG. 2.

In FIG. 2, the filter element 1 comprises filter plates 8 of which the wave forms run transversely to the direction of flow and as particularly emphasized by FIG. 4 in enlarged cutout, is formed by wave crest groups of the same amplitude, connected by deep wave troughs 9. The wave crest groups are composed of in each case two wave crests 10, which are connected by a flat wave trough 11. The layer structure of the filter is obtained by a continuous reflection of a filter plate 8 at an imaginary plane 12 which forms a tangent to the vertices of the deepest wave troughs of the respective filter plate. The filter plates 8 lay one on top of the other at their tangents to the reflection plane 12. The unreflected form of the filter plate is transformed into itself after an even number of repeated reflections. Between the tangents, mutually neighboring filter plates bound passages 13, 14 of differing cross-section, running along the direction of flow. The passages 13, which are bounded between the tangents lying at the vertices of the wave troughs 11 and serve for conducting raw gas, have a significantly larger cross-section in comparison with the passages 14, which are bounded between the tangents lying in the crest lines of the wave crests 10 and serve for conducting clean gas. In a way similar to the filter element of FIG. 1, for the flowing-through of the plate areas, the filter plates forming the raw-gas passages 13 are pressure-welded to one another at the end of the soot-particle filter on the outflow side and the filter plates forming the clean-gas passages 14 are pressure-welded to one another at the end of the soot-particle filter on the inflow side.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An exhaust-gas soot-particle filter, comprising a right parallelepiped filter element configured as wave-shaped layers of filter plates transverse to a flow direction of exhaust gas and, in a continuous layer sequence, are arranged alternately in parallel to the flow direction to form with one another inlet passages for raw gas and outlet passages for clean gas, wherein the inlet passages have a larger cross-section than a cross-section of the outlet passages and, in the flow direction, are joined gas-tight with an outflow side of the filter whereas the outlet passages are joined gas-tight at an inflow side of the filter, the inlet passages and the outlet passages being formed by the filter plates and extending parallel to each other with uniform cross-section, and respective pairs of mutually neighboring filter plates having an identical phase and periodically, but different amplitude and forming a plate group with a layer structure arranged phase-shifted by 180° with respect to neighboring plate groups.

2. An exhaust-gas soot particle filter, comprising a right parallelepiped filter element configured as wave-shaped layers of filter plates transverse to a flow direction of exhaust gas and, in a continuous layer sequence, are arranged alternately to form with on another inlet passages for raw gas and outlet passages for clean gas, wherein the inlet passages have a larger cross-section than a cross-section of the outlet passages and, in the flow direction, are joined gas-tight at an outflow side of the filter whereas the outlet passages are joined gas-tight at an inflow side of the filter, the inlet passages and outlet passages being comprised by a waved filter plate in which wave crest groups of the same amplitude are connected by deep wave troughs and are in each group composed of wave crests connected to one another by flat wave troughs and extend in parallel to each other with uniform cross-section, and a layer structure of the filter element is configured as continuous reflection of the filter plate at an imaginary plane which forms a tangent to vertices of the deep wave troughs of the respective filter plate.

* * * * *